US008967581B2

(12) United States Patent
L'Huillier et al.

(10) Patent No.: US 8,967,581 B2
(45) Date of Patent: Mar. 3, 2015

(54) SEAT CONNECTOR AND METHOD OF USING SAID SEAT CONNECTOR

(75) Inventors: Étienne L'Huillier, Sherbrooke (CA); Étienne Archambault, Sherbrooke (CA)

(73) Assignee: Baultar I.D. Inc., Val Joli, Quebec (CA)

( * ) Notice: Subject to any disclaimer, the term of this patent is extended or adjusted under 35 U.S.C. 154(b) by 0 days.

(21) Appl. No.: 13/409,848

(22) Filed: Mar. 1, 2012

(65) Prior Publication Data

US 2013/0047400 A1 Feb. 28, 2013

Related U.S. Application Data

(60) Provisional application No. 61/526,377, filed on Aug. 23, 2011.

(51) Int. Cl.
*F16M 13/00* (2006.01)
*B23P 11/00* (2006.01)
(Continued)

(52) U.S. Cl.
CPC .............. *B23P 11/00* (2013.01); *F16B 21/09* (2013.01); *B60N 2/682* (2013.01); *B61D 31/00* (2013.01); *B60N 2/14* (2013.01); *B60N 2/24* (2013.01)
USPC ......................................... 248/424; 248/423

(58) Field of Classification Search
CPC ......... B23P 11/00; F16B 21/09; B60N 2/682; B60N 2/14; B60N 2/25; B61D 31/00
USPC .................. 248/157, 158, 424, 425, 429; 297/344.1, 344.16
See application file for complete search history.

(56) References Cited

U.S. PATENT DOCUMENTS 5,374,102 A * 12/1994 Archambault et al. .. 297/344.13
5,683,140 A 11/1997 Roth et al.
(Continued)

FOREIGN PATENT DOCUMENTS

EP 0459173 A2 12/1991
GB 2419854 B 3/2008
(Continued)

OTHER PUBLICATIONS

"The Ultimate Greco Smart Seat Review (with tons of pics)!", carseatBlog.com, http://carseatblog.com/8834/the-ultimate-graco-smart-seat-review-with-tons-of-pics/ 11 pages, Jun. 2012.

*Primary Examiner* — Gwendolyn W Baxter
(74) *Attorney, Agent, or Firm* — Nath, Goldberg & Meyer; Jerald L. Meyer (57) ABSTRACT

A seat connector which connects a vehicle seat with a base support, and method of connecting the same. The set connector has a base interface which connects to the base support, and a seat interface which connects to the vehicle seat. Both interfaces cooperate together by having the seat interface slide along the base interface. Both during and before this sliding engagement, the weight of the seat interface and the attached seat are supported by the base interface and other weight supports. Upon completing the sliding engagement, the vehicle seat is temporarily in a locked position where movement of the vehicle seat in all directions relative to the base support is restrained, even without the use of mechanical fasteners to secure the connection. The vehicle seat is then secured to the base support with mechanical fasteners. The vehicle seat can be removed from the base support by sliding the vehicle seat in a rearward direction along the base interface.

17 Claims, 8 Drawing Sheets

(51) Int. Cl.
*F16B 21/09* (2006.01)
*B60N 2/68* (2006.01)
*B61D 31/00* (2006.01)
*B60N 2/14* (2006.01)
*B60N 2/24* (2006.01)

(56) References Cited

U.S. PATENT DOCUMENTS

| 5,947,562 | A | 9/1999 | Christofferson et al. |
| 6,312,037 | B1 | 11/2001 | Garrido et al. |
| 7,303,236 | B2 * | 12/2007 | Ritter et al. ............... 297/344.11 |
| 7,413,371 | B2 | 8/2008 | Arnold et al. |
| 7,837,260 | B2 | 11/2010 | Hein et al. |
| 7,922,142 | B2 * | 4/2011 | Koutsky et al. ................ 248/424 |
| 8,376,305 | B2 * | 2/2013 | Riemenschneider et al. 248/423 |
| 2005/0285006 | A1 * | 12/2005 | Koutsky et al. ................ 248/424 |

FOREIGN PATENT DOCUMENTS

| JP | 2006298235 A | 11/2006 |
| JP | 2007112175 A | 5/2007 |
| WO | 2010083607 A1 | 7/2010 |

* cited by examiner

SEAT CONNECTOR AND METHOD OF USING SAID SEAT CONNECTOR

RELATED APPLICATION

This application claims the benefit of U.S. Provisional Application No. 61/526,377 filed on Aug. 23, 2011 and entitled "Rapid Seat Connector, Corresponding Seat and Vehicle Provided with said Seat Connector, Method of Using said Seat Connector, and Kit for Assembling the same".

The above patent application is incorporated herein by reference in its entirety.

FIELD OF THE INVENTION

The present invention relates to a seat connector. More particularly, in its intended preferred use, the present invention relates to an improved seat connector that allows quick, tamper-proof, wobbling-free and low-effort connection and disconnection between a seat and its mounting base.

BACKGROUND OF THE INVENTION

Driver and passenger seats in vehicles such as locomotives and cars, for example, which are capable of fore/aft displacement and rotation, are well known in the art.

For example, the Applicant knows of PCT application WO 2010/083607 A1 which describes a seat assembly for pivoting and displacing the seat forward and backward within a vehicle. The assembly includes a seat track assembly which connects to the seat cushion for providing fore and aft sliding motion.

Vehicle seats are generally installed to a mounting base/column or the vehicle floor during assembly of the vehicle and can also be removed for maintenance or other purposes. Solutions for facilitating the installation and removal of vehicle seats have been the subject of much prior art.

For example, U.S. Pat. No. 6,312,037 to Garrido et al. describes a quick install for a seat without using threaded fasteners. The seat must first be laid with anchor pins and the floor attachment aligned. Then, each anchor must be manipulated with a special tool either for locking or for unlocking the seat, depending on the specific embodiment.

U.S. Pat. No. 5,947,562 to Christofferson et al. describes a quick-release seat assembly for a light seat. The seat must be brought entirely above the base before being successfully laid onto the attachment interface.

Also known to the Applicant is U.S. Pat. No. 7,413,371 to Arnold et al. which describes a quick special fastener to connect a seat to a vehicle structure. The fastener is not an integrated part of the seat system and must be adapted to the particular vehicle structure it is being used with. Each anchor must be manipulated before the seat can be uninstalled.

GB 2 419 854 and EP 0459173 A2 describe a floor anchor system for a vehicle which allows for multiple installation configurations, for example. These inventions relate more to configuration versatility rather than installation per se. The Applicant is also aware of U.S. Pat. Nos. 5,683,140 and 7,837,260 B2, as well as Japanese patent applications JP 2006298235 and JP 2007112175.

It is also known to provide an upper seat interface for a vehicle seat, such as for a locomotive driver seat which has a quick, simple and easy connection, as described in U.S. Pat. No. 5,374,102 granted to the Applicant. The chair assembly integrates one or two removable limits onto laterally extending channels, the limits being used to maintain the seat base plate mounted with bearings into the said channels. When the limits are removed by a maintenance crew, the upper seat can be easily removed from its base. This constitutes a quick installation system. However, because the chair assembly provides fore-aft motion, if the limits are not reinstalled properly, there exists the risk that the vehicle operator could be injured by a fall while trying to adjust his seat fore or aft.

Also known to the Applicant are child vehicle seats, which are often sold in two parts: a base portion that is secured with anchors or to a seatbelt, and a seat portion that connects to the base portion allowing the seat to face forward or backward in the vehicle. For example, the Applicant is aware of such vehicle seats sold by Graco Children's Products Inc. (Pennsylvania, USA).

Thus, although the prior art teaches vehicle seats, and components and methods for installing and removing them, there exist substantial drawbacks associated with such conventional systems and techniques, such as: 1) conventional seats must be carefully aligned with their base mounts which requires much time and can be physically demanding on the technician; 2) the seat is not secured when placed on the mounting base and requires fasteners to properly secure it, which reduces the safety of the uninstalled seat for both technicians and operators; 3) the installation and removal of seats requires manipulation and alignment of fasteners, which is time consuming; 4) raising the seat over the mounting base repeatedly can lead to injury and health issues for operators; etc.

Hence, in light of the aforementioned, there is a need for an improved seat connector and method for installing the same, which by virtue of its design and components, would be able to overcome or at least minimize some of the aforementioned prior art problems.

SUMMARY OF THE INVENTION

An object of the present invention is to provide a seat connector and method that addresses the above-mentioned needs.

According to the present invention, there is provided a seat connector for removably connecting a vehicle seat with a base support, the seat connector comprising:

a base interface removably mountable to the base support, the base interface being provided with at least one guide member;

a seat interface removably connectable to the base interface and being configured for receiving the vehicle seat, thereby removably connecting the vehicle seat with the base support, the seat interface being provided with at least one slide member such that the at least one slide member cooperates with the at least one guide member upon removably connecting the seat interface to the base interface, thereby creating a temporarily locked connection between the vehicle seat and the base support;

at least one support provided on the base interface, the at least one support supporting at least a portion of a weight of the seat interface at least prior to or during cooperation of the at least one slide member with the at least one guide member; and at least one movement restrictor being provided on at least one of the base interface and the seat interface, the at least one movement restrictor restricting movement of the vehicle seat relative to the base support upon temporarily locking of the vehicle seat with the base support.

According to the present invention, there is also provided a seat connector for removably connecting a vehicle seat with a base support, the seat connector comprising:
- a base interface removably mountable to the base support;
- a seat interface removably connectable to the base interface and being configured for receiving the vehicle seat; and
- wherein the seat interface removably connects to the base interface by sliding along at least a portion of the base interface until the seat interface is in a temporarily locked connection for being eventually secured to the base interface, thus connecting the vehicle seat with the base support.

According to the present invention, there is also further provided a method for removably connecting a vehicle seat to a base support, the method comprising the steps of:
- a) providing a seat interface, configured for removably connecting to the vehicle seat and provided with at least one slide member, and a base interface removably mountable to the base support and provided with at least one guide member;
- b) cooperating the at least one slide member with the at least one guide member such that a temporarily locked connection is created between the vehicle seat and the base support, wherein at least a portion of a weight of the seat interface, at least prior to or during cooperation of the at least one slide member with the at least one guide member; is supported; and
- c) restricting movement of the vehicle seat relative to the base support upon temporarily locking the vehicle seat and the base support.

According to the present invention, there is also further provided a method of removably connecting a vehicle seat to a base support, the method comprising the steps of:
- a) positioning a seat interface receiving the vehicle seat in relation to a base interface removably connected to the base support;
- b) sliding the seat interface along at least a portion of the base interface until the seat interface is in a temporarily locked connection such that movement of the vehicle seat connected to the seat interface relative to the base support is restricted; and
- c) securing the seat interface to the base interface with fasteners.

Preferably, the present invention facilitates the connection of the seat interface with the base interface by supporting the weight of the seat interface and/or the vehicle seat before and while the seat interface is slide along guide members into its temporarily locked connection. The temporarily locked connection provides a measure of security to both the technician installing the seat as well as an eventual operator of the seat.

Preferably also, guide member, slide member, support and movement restrictor are pairs of the same, and are symmetrically opposed on either the base interface of the seat interface, thereby providing a controlled and load-supported connection of the seat interface to the base interface by the technician. These pairs additionally aid in achieving the temporarily locked connection by cooperating so as to restrain the movement of the seat interface relative to the base interface in all directions. Once temporarily locked, the seat interface and the base interface can be connected and secured together by tamper-proof mechanical fasteners or by an automatic snap-in device.

Preferably also, the seat interface can be easily removed from the base interface. When in the temporarily locked connection, the seat interface can be easily disconnected and/or removed from the base interface by simply lifting a rear of the seat interface in an overall rearward sliding movement, then sliding the slide members backward along the guide members until the seat interface is removed from the base interface.

BRIEF DESCRIPTION OF THE DRAWINGS

These and other objects and advantages of the invention will become apparent upon reading the detailed description and upon referring to the drawings in which.

DETAILED DESCRIPTION OF PREFERRED EMBODIMENTS OF THE INVENTION

Although the present invention was primarily designed for installing, connecting and/or removing vehicle seats, for example, it may be used to install, remove, connect or adapt other devices or in other fields, as apparent to a person skilled in the art. For this reason, expressions such as "vehicle", "base support", "seat", etc., as used herein should not be taken as to limit the scope of the present invention and includes all other kinds of materials, objects and/or purposes with which the present invention could be used and may be useful such as, for example, for any device that is installed in a temporarily precarious position and/or for preventing the fall of an object which cause significant damages.

Moreover, in the context of the present invention, the expressions "base support", "mounting base", "vehicle base", "floor support", "vehicle support" and any other equivalent expression known in the art will be used interchangeably. Furthermore, the same applies for any other mutually equivalent expressions, such as "cooperate", "slide", "glide", "push", "coax", "launch", "move", "propel", "shove", "skate", "guide" and "thrust" as also apparent to a person skilled in the art.

Broadly described, the seat connector according to the present invention, as shown in the accompanying drawings, is a device which, in its preferred intended use, allows for the quick, simple and low-effort connection and removal of a vehicle seat to a mounting base or vehicle floor. Specifically, the seat connector has a base interface which can be mounted to a base support, and a seat interface which can be attached to a vehicle seat. The vehicle seat equipped with the seat interface, or the seat interface alone, is easily mounted onto the base interface (and thus the base support) by cooperating with at least one guide member of the base interface until the seat interface is in a temporarily locked connection, ready to be secured.

Figure 1:
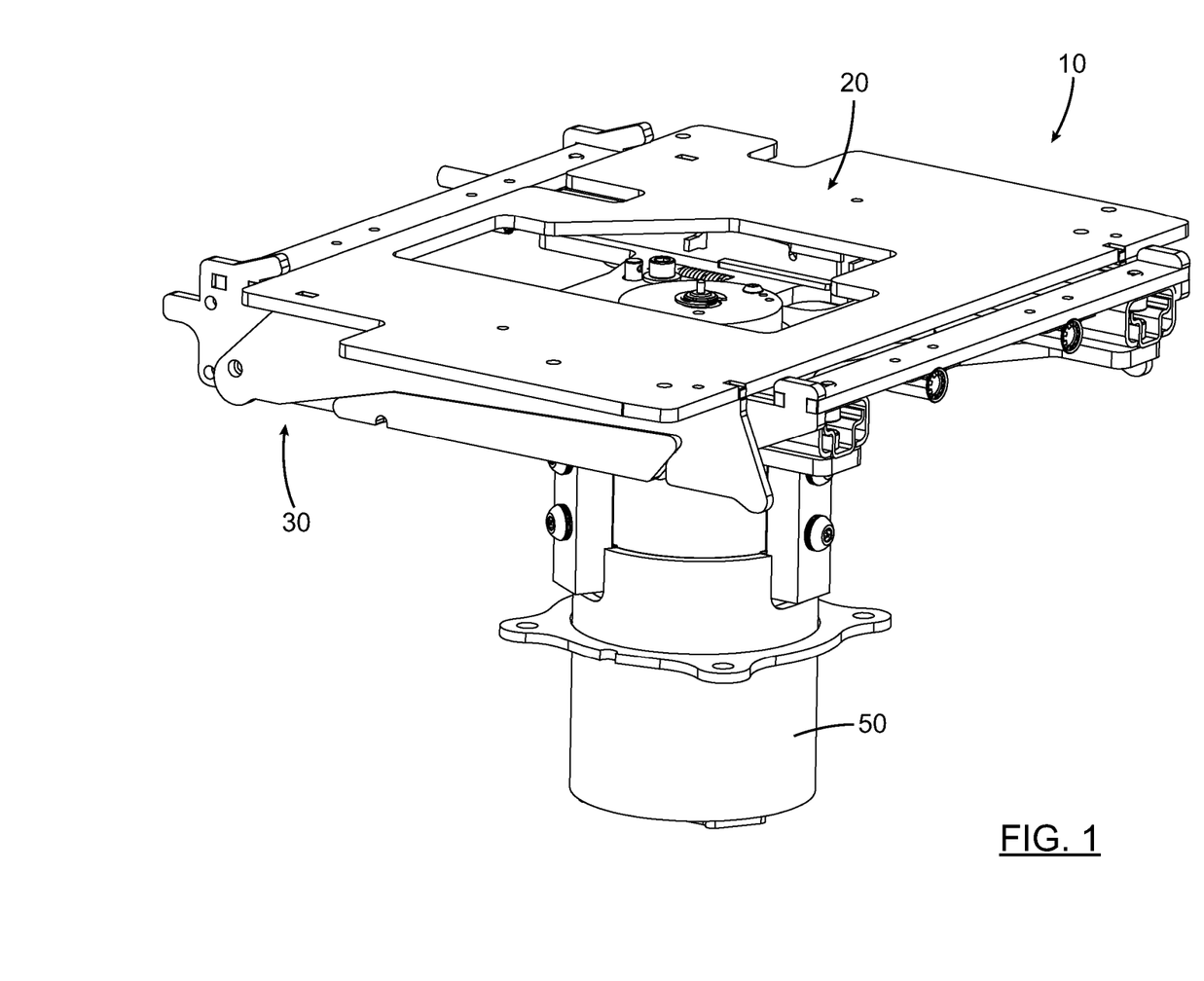
FIG. 1 is a perspective view of a seat connector mounted to a base support, according to a preferred embodiment of the present invention.

As illustrated in FIG. 1, the seat connector 10 removably connects the vehicle seat 60 (as exemplified in FIG. 8) with the base support 50 and comprises a base interface 30 which is removably mountable to the base support 50. The seat connector 10 also has a seat interface 20 which is removably mountable to the base interface 30 (and thus the base support 50), and is also configured for receiving the vehicle seat. The base interface 30 and seat interface 20 are configured such that, when the seat interface 20 is being removably connected to the base interface 30, the seat interface 20 cooperates with the base interface 30 until the seat interface 20 is in a temporarily locked connection for being eventually secured to the base interface 30. The terms "cooperate" or "cooperation" in the context of the present invention are understood to mean that the seat interface 20 interacts with, and is guided by, the base interface 30. Since the seat can be attached to the seat interface 20, and since the base interface 30 can be attached to the base support 50, the seat and the base support 50 are thus temporarily locked when the seat interface 20 is slidably mounted into the locked position over the base interface 30.

Figure 2:
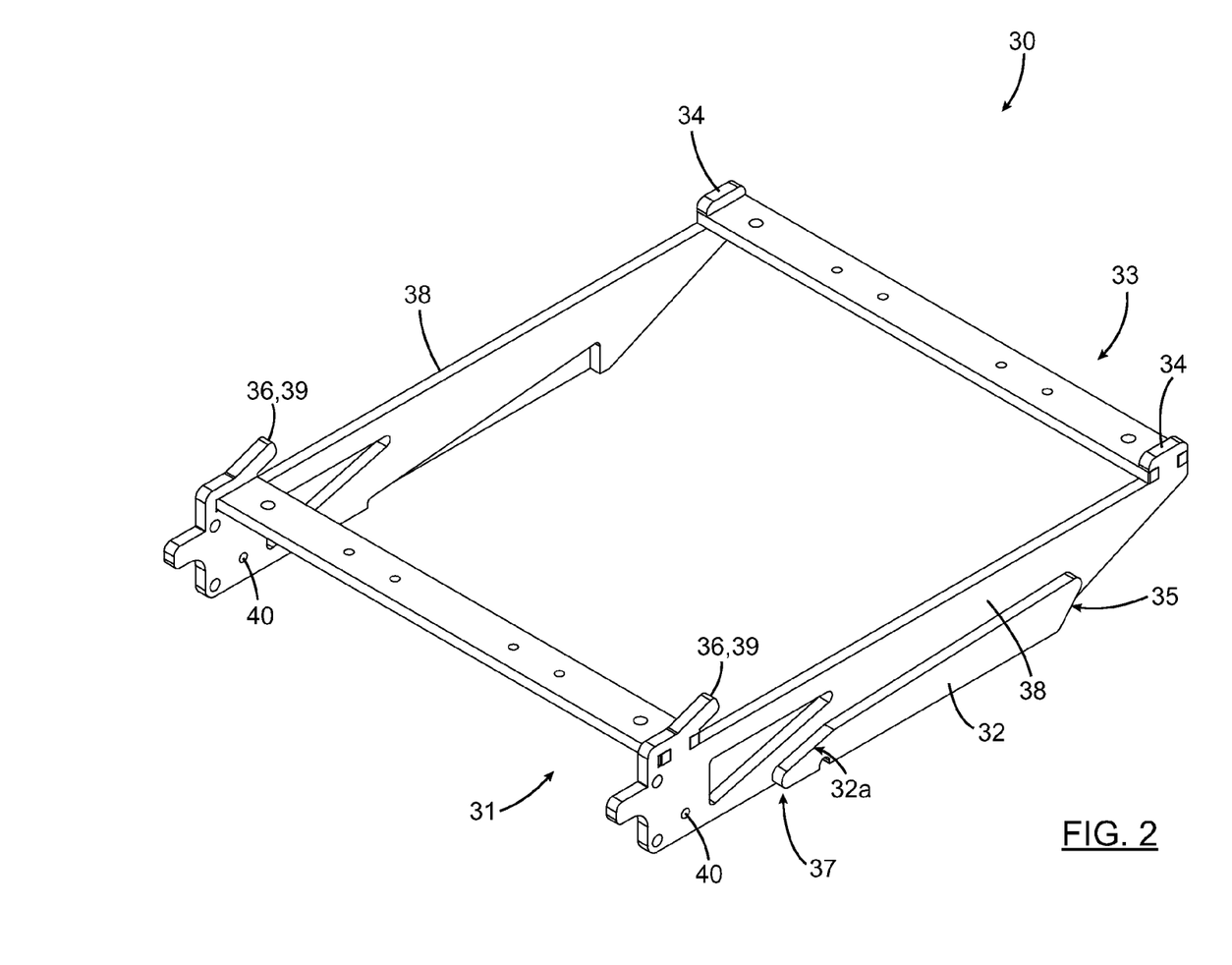
FIG. 2 is a top perspective view of a base interface, according to a preferred embodiment of the present invention.

Turning now to FIG. 2, the base interface 30 is preferably rectangular in shape so as to facilitate the symmetry of components describe below. However, it is understood that the base interface 30 is not limited to a rectangular shape, and can be any other shape which provides suitable symmetry to its components permitting them to accomplish the functions ascribed to them herein, as further described below. The base interface 30 preferably has as a front 31 and a rear 33.

The base interface 30 has at least one guide member 32 for guiding the seat interface to the temporarily locked connection when it cooperates with the base interface 30. Preferably, the cooperation of the seat interface 20 with the base interface 30 is understood here to mean that the seat interface 20 slides along the at least one guide member of the base interface 30. The guide member 32 preferably comprises a rear extremity 35 corresponding to the rear 33 of the base interface 30 and a front extremity 37 corresponding to the front 31 of the base interface 30. The guide member 32 is preferably inclined or sloped at any suitable angle known in the art. The slope runs the length of the guide member 32 and downwards (i.e. towards the base support). One preferred angle of the slope is about 2.5 degrees relative to the horizontal (i.e. the vehicle floor, for example). The slope preferably begins at the rear extremity 35, and slopes downward towards the front extremity 37. The sloped guide member 32 facilitates the connection of the seat interface to the base interface 30 by preferably slidably guiding the seat interface towards its temporarily locked connection, such that its notches align with the notches of the base interface 30, as explained below.

The sloped guide members 32 preferably provide an additional functionality of preventing an involuntary disconnection of the seat interface and the base interface 30 when both are in the temporarily locked connection, thus providing a measure of stability to the temporarily locked connection. As apparent to a person skilled in the art, and as explained below, the weight of the vehicle seat preferably forces the slide members of the seat interface to slide downward along the sloped guide members 32 until the slide members reach the temporarily locked connection. This same vehicle seat weight, in cooperation with the downwardly sloped guide members 32, prevent the vehicle seat and/or the seat interface from sliding back up along the sloped guide members 32, thus providing the above-mentioned stability.

In another preferred embodiment, the slope guide members 32 may be "double-sloped", meaning that they may include a steeper sloped portion 32a, which is steeper than the sloped guide member, near the front 31 of the base interface 30. One preferred angle of the slope is about 15 degrees relative to the horizontal. This steeper sloped portion 32a provides even more stability when the seat interface and base interface 30 are in the temporarily locked connection, as apparent to a person skilled in the art, and helps to align the notches 40 of the seat interface and base interface 30.

Still referring to FIG. 2, the guide member 32 can be designed so as to facilitate the entry of the seat interface at an angle to the base interface 30, thus facilitating the loading of the seat interface onto the base interface 30 by the technician. The guide member 32 therefore provides automatic alignment and connection of the seat interface to the base interface 30, and also constrains the motion of the seat interface relative to the base interface 30, as further explained below. As such, it is understood by a person skilled in the art that any other guide member 32 configuration, shape and/or profile capable of such functionality is also within the scope of the present invention, and thus is also possible.

Preferably, there are two guide members 32, each in symmetric opposed relation to the other on the outer surfaces 38 of the base interface 30, so as to not hinder the securing of both interfaces together. The guide members 32 can be situated anywhere on the base interface 30, so long as they are sufficiently in opposed relation so as to fully support and balance the seat interface when it is in sliding engagement with the base interface 30, as apparent to a person skilled in the art. The guide members 32 can also support the weight of the seat interface and/or vehicle seat when initially placed upon the base interface 30 for sliding engagement, as well as during sliding engagement.

The base interface 30 also has at least one support 34 which supports at least a portion of the weight of the seat interface when first mounted onto the base interface 30 and during sliding engagement with the base interface 30. It is understood that the at least one support 34 can also be placed on the seat interface and accomplish the same functionality (i.e. supporting a weight of the seat interface and/or seat, restricting movement, etc.), as described herein. The support 34 can take different configurations, shapes, sizes and/or profiles provided that it fully supports a portion of the seat's weight, and that it balances the seat interface when it is placed upon it, as apparent to a person skilled in the art. There are also preferably two supports 34 that are in a similar spaced relation as that described above for the guide members 32. As but one non-limitative example of an alternative configuration of supports 34, it is within the scope of the present invention to have a continuous elongated support 34, rather than (or in addition to) two discrete supports, as exemplified in FIG. 2. Furthermore, the supports 34 can be positioned on the base interface 30, for example near the rear of the base interface 30, so as to approach the center of mass of the technician, further facilitating the technician's work by reducing the load to bear and the forces resulting therefrom.

Figure 3:
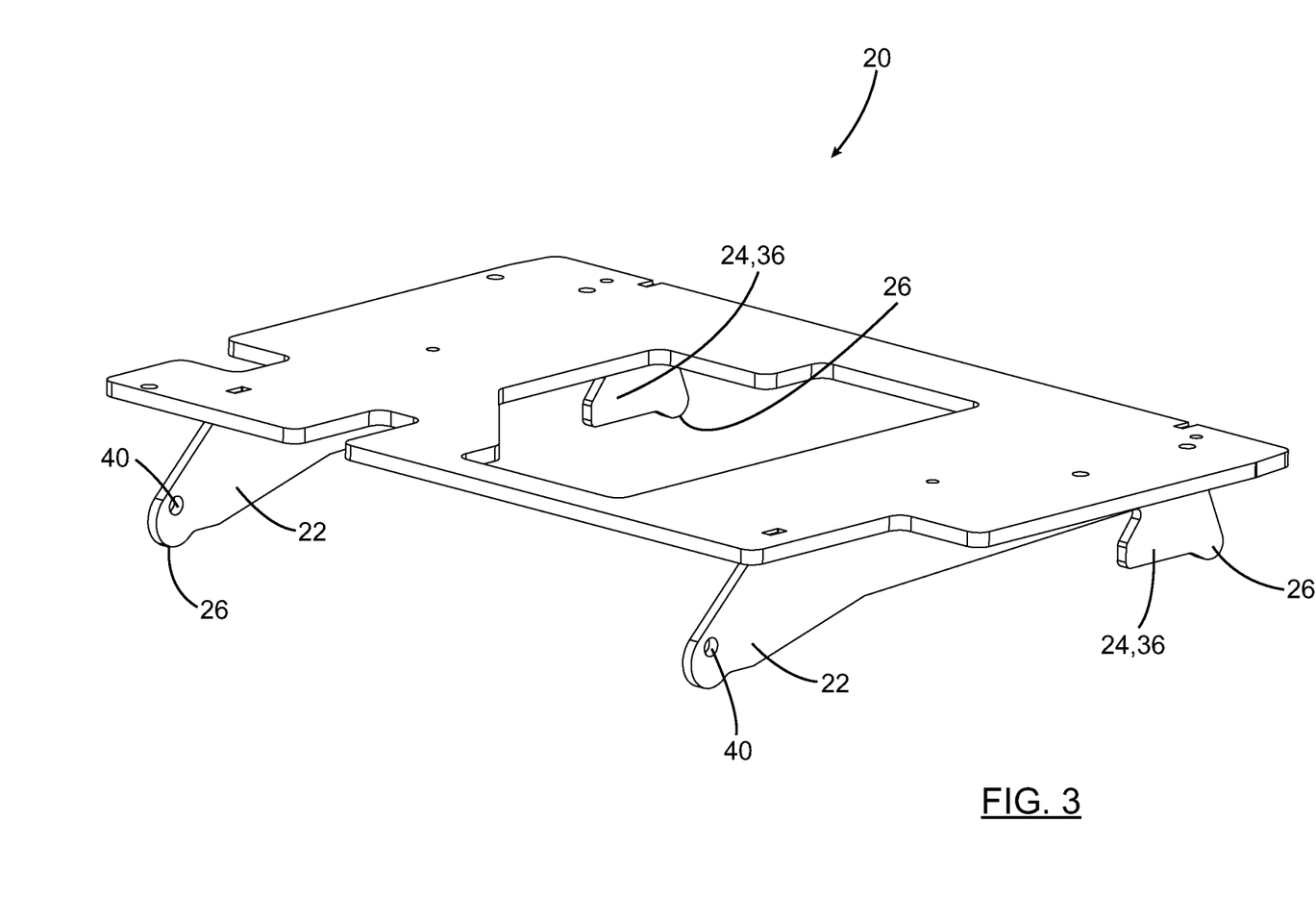
FIG. 3 is a top perspective view of a seat interface, according to a preferred embodiment of the present invention.

Turning now to FIG. 3, the seat connector is also provided with a seat interface 20. The seat interface 20 is removably connectable to the base interface and is also configured to receive the vehicle seat. It is thus understood that by receiving the vehicle seat and connecting to the base interface, the seat interface 20 thereby connects the vehicle seat to the base support. By "removably connectable", it is understood that the seat interface 20 can be easily connected to, and easily removed from, the base interface. As with the base interface described above, the seat interface 20 is preferably rectangular in shape, but is not limited to such a configuration.

The seat interface 20 has at least one cooperating member which cooperates with the at least one guide member when connecting the seat interface 20 to the base interface, thereby creating the temporarily locked connection between the vehicle seat and the base support. As explained above, the term "cooperating member", "cooperation", etc. encompasses many techniques by which the seat interface 20 connects to the base interface (i.e. placing the seat interface 20 directly on the base interface, gliding it in a groove, bring it up from underneath the base interface, etc.). However, for the purpose of describing the connection of the seat interface 20 and the base interface, and by no means limiting the scope of said terms, "cooperation", "cooperating" etc. preferably mean sliding the seat interface 20 along the base interface, and the "cooperation member" will be herein referred to as "slide member" 22.

Figure 8:
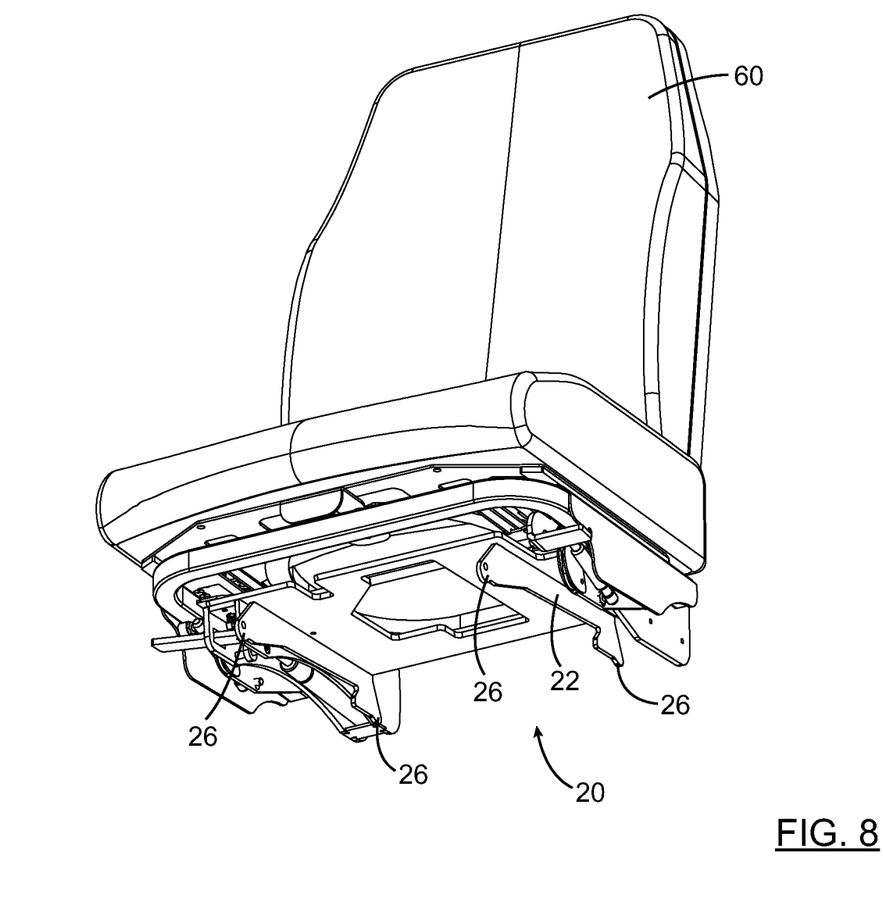
FIG. 8 is a bottom perspective view of a vehicle seat equipped with a seat interface, according to a preferred embodiment of the present invention.

The at least one slide member 22 preferably contours its corresponding guide member so that the slide member 22 is slidably guided by the at least one guide member. There are preferably two slide members 22, each in a similar opposed relationship as that of the guide members described above. The expression "contour" in the context of the present invention preferably means that the slide member 22 has a profile that is substantially similar or matching to the profile of its corresponding guide member, thus facilitating their sliding engagement. The slide member 22 can also include a notch 40, which aligns with a notch on the base interface when the seat interface 20 is in the temporarily locked connection. The slide member 22 can also have noses 26 for supporting the seat interface 20 when it is laid upon the ground, or the vehicle seat 60 equipped with the seat interface 20, as illustrated in FIG. 8. The noses 26 can also serve to cooperate with the slope of the guide member 32, as explained below, by sliding along the guide members until the seat interface 20 reaches the temporarily locked connection.

Figure 7:
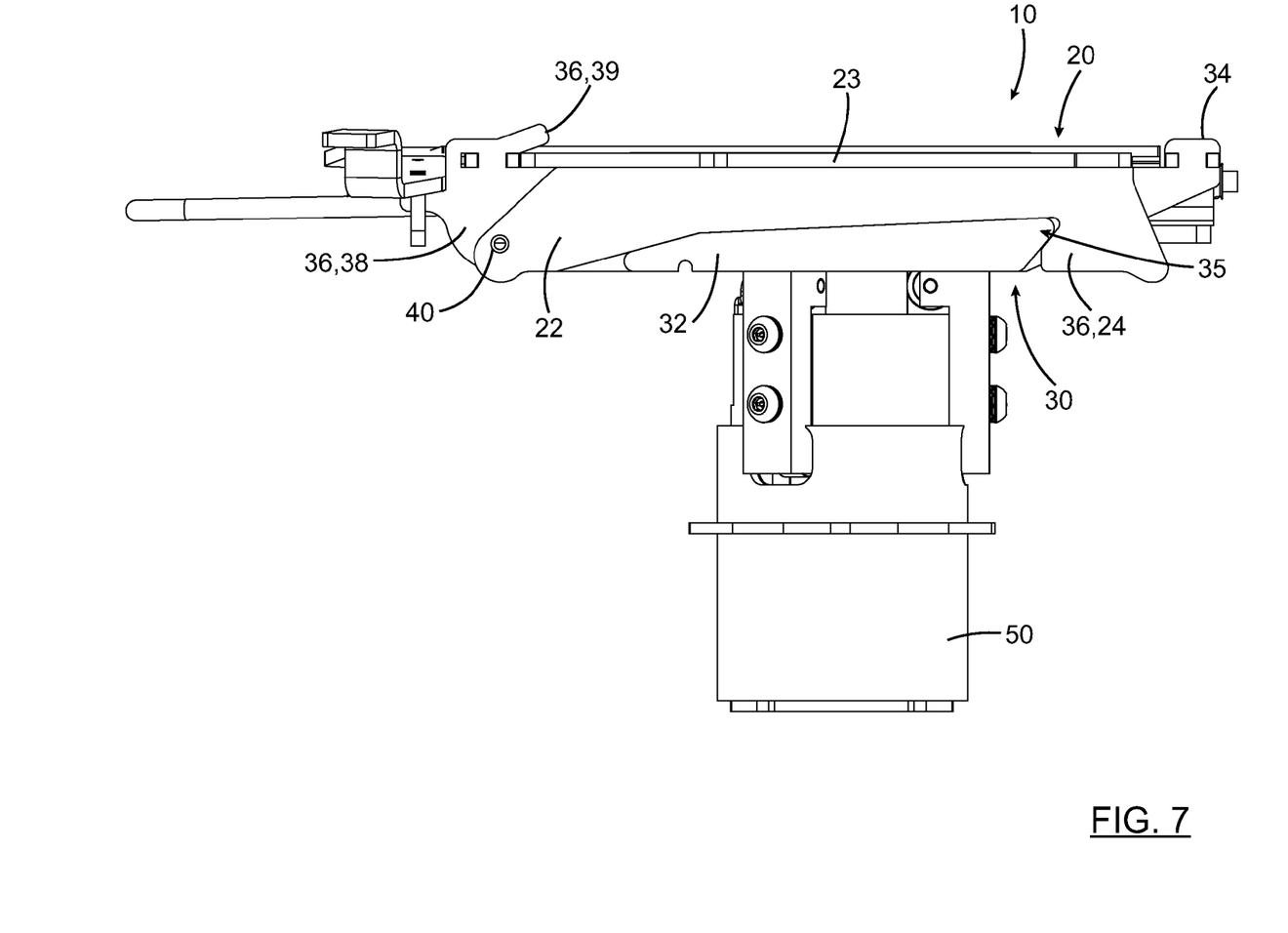
FIG. 7 is a side view of the seat interface and the base interface of FIG. 4 in a temporarily locked connection.

Referring to FIG. 7, the seat connector 10 also comprises at least one movement restrictor 36. The movement restrictor 36 is located either on the base interface 30 or the seat interface 20, and restricts movement of the vehicle seat relative to the base support 50 when the seat and base support are in the temporarily locked connection. The restrictor 36 also restricts movement of the seat interface 20 relative to the base interface 30. There are also preferably two restrictors 36 that are in a similar spaced relation as that described above for the guide members 32. As illustrated in FIG. 7, the restrictors 36 can take different forms in order to constrain or restrict motion in the horizontal, vertical, and forward/rearward directions when the seat interface 20 is in the locked position over the base interface 30. Of course, it is understood that the restrictors 36 do not restrict all movement, and that the restrictors 36 are preferably configured so as to facilitate a rapid disconnection of the vehicle seat and/or seat interface 20 from the base support 50.

The restrictors 36 preferably consist of at least two retainers 39 and at least two stop members 24. Both retainers 39 and stop members 24 are in a similar opposed symmetric relationship as that described above for the guide members 32. The retainers 39 are preferably located on the base interface 30 near its front, and the stop members 24 are preferably located on the seat interface 20 near the rear. It is understood that the shape and/or profile of the retainers 39 and/or stop members 24 which can take many different forms provided that the their cooperation, as explained below, restricts the motion of the seat interface 20 relative to the base interface 30, as apparent to a person skilled in the art.

As mentioned previously, the restrictors 36 and other components interact to prevent motion of the vehicle seat relative to the base support 50 in the horizontal, vertical, and forward/rearward directions. Considering now the horizontal direction (i.e. motion between symmetrically opposed guide members 32), the outer surfaces 38 of the guide members 32 act as restrictors 36 and prevent movement by interacting with the slide members 22. For the vertical direction (i.e. motion parallel to the base support 50), the retainers 39 can be angled protrusions shown above the notches 40 extending upward away from the base interface 30, and interact with a plate 23 of the seat interface 20 to prevent movement. The rear extremities 35 of the guide members 32 also constrain vertical movement because of their backward angled portions, which interact with stop members 24. For the forward/rearward direction (i.e. motion between the notch 40 and the supports 34), the rear extremities 35 of the guide members 32 interact with stop members 24 of the seat interface 20 to constrain forward motion; the forward incline of the guide members 32 interact with the corresponding slide member 22, and optionally, the supports 34 interact with the plate 23 of the seat interface 20, all of which help to constrain or control the rearward motion. Thus, as can be now easily understood, when reference is made herein to the "temporarily locked connection" or "temporarily locked position", this preferably refers to the constraint of motion in all three directions herein described. Inserting fasteners into the notches 40 adds a further level of movement restraint. Of course, numerous other possible configurations and/or shapes for the restrictors 36 are possible, as apparent to a person skilled in the art. Thus it is apparent that, even when the seat interface 20 is not secured to the base interface 30 with fasteners, and is thus in the "temporarily locked connection", the seat interface 20 and/or the attached vehicle seat will not move or fall off the base interface 30.

In a preferred embodiment, both the seat and base interfaces 20, 30 have notches 40 which become aligned when the seat interface 20 is slidably mounted into its temporarily locked connection on the base interface 30. The notches 40 are configured for receiving fasteners or other similar mechanical attachment mechanisms, which secure the seat interface 20 to the base interface 30, thus providing a secured connection. The fasteners are preferably tamper-proof. Preferably also, the seat interface 20 is secured in the locked position with the base interface 30 by an automatic snap-in device.

Referring now to FIGS. 4 to 7, the method for removably connecting the vehicle seat to the base support is herein further explained.

Figure 4:
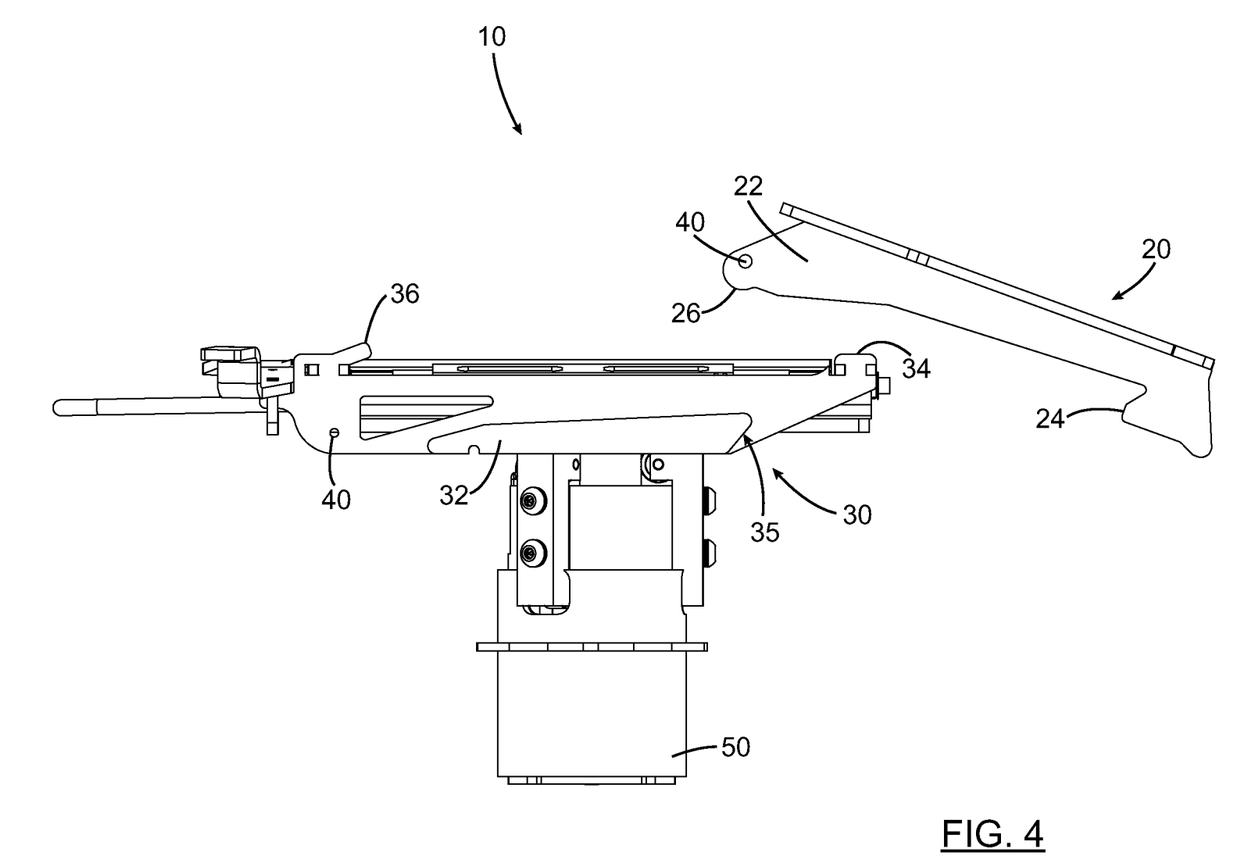
FIG. 4 is a side view of a seat interface about to be placed onto a base interface, according to a preferred embodiment of the present invention.
Figure 5:
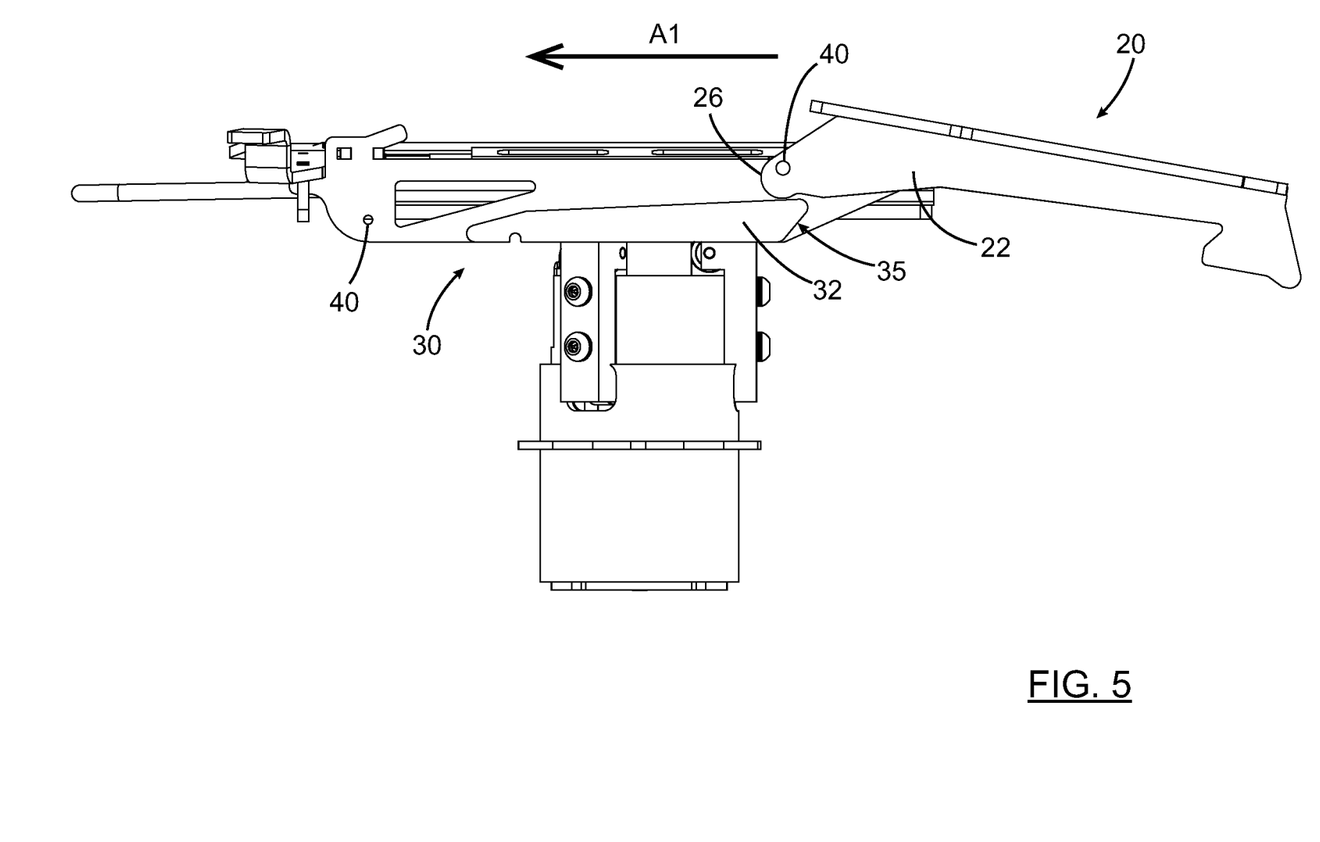
FIG. 5 is a side view of the seat interface and the base interface of FIG. 4 cooperating together.

As exemplified in FIGS. 4 and 5, the seat interface 20 is lifted with or without an attached vehicle seat, and the noses 26 or slide members 22 are placed onto the rear end of the guide members 32 and/or the support 34. This helps to support at least part of the weight of the seat interface 20 and vehicle seat, thus reducing some of the lifting required of the technician and/or machine, as illustrated in FIGS. 5 and 6.

Figure 6:
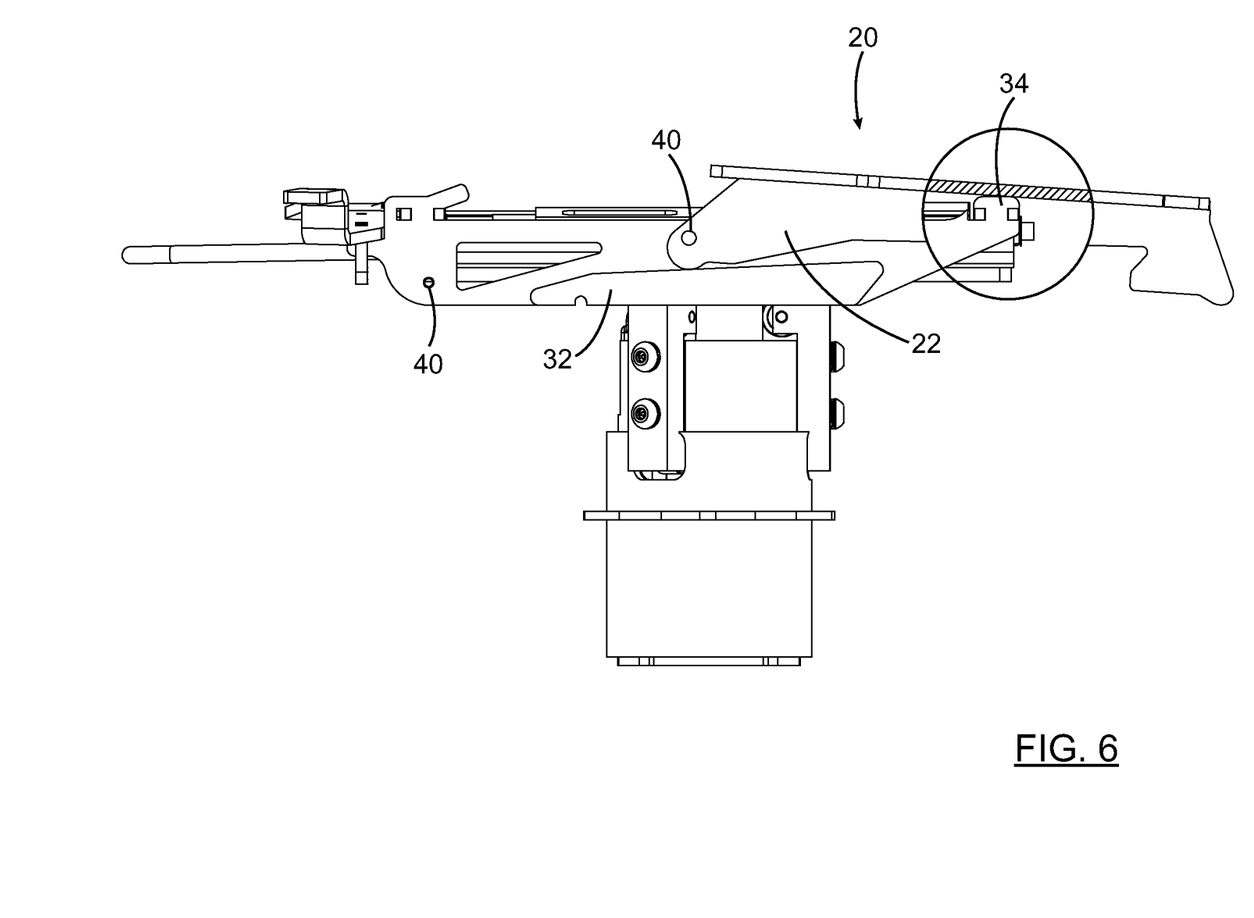
FIG. 6 is a side view of the seat interface and the base interface of FIG. 4 being supported by a support.

Referring to FIGS. 5 and 6, the cooperating or slide members 22 of the seat interface 20 are then "cooperated" or slid in the direction of arrow A1 by the technician. The slide members 22 slide along the guide members 32 until the seat interface 20 reaches its temporarily locked connection. Either before or during this sliding engagement, at least a part of the weight of the seat interface 20 can be further supported by the supports 34, as shown in FIG. 6, in addition to the support already provided by the guide members 32.

Referring to FIGS. 6 and 7, this sliding engagement preferably continues until the notches 40 of the seat interface 20 align with the notches 40 of the base interface 30 and when the slide members 22 are stably seated on the guide members 32, thus placing the seat interface 20 and the base interface 30 in the temporarily locked connection where relative movement between the seat and the base support 50 is restricted.

Once in said temporarily locked connection, the seat interface 20 is secured to the base interface 30 by fasteners or other mechanisms known in the art.

Preferably, the above-described method can include an additional step where the seat interface 20 is initially placed at an angle on the base interface, which would facilitate manual manipulation, as apparent to a person skilled in the art. Preferably, there is provided a view of the base interface 30 prior to placing the seat interface 20 thereupon so as to improve the technician's view of the parts to be aligned. Furthermore, the sliding engagement above can be facilitated by placing the nose 26 of the sliding member 22 onto the rear end of the guide member 32, and then sliding the nose 26 along the guide member 32 so as to create the temporarily locked connection, as exemplified in FIG. 5.

It is also apparent to a person skilled in the art that the particular shape, size and configuration of the restrictors 36 and the guide members 32, in addition to facilitating connection of the seat 60 to the base support 50, allow for the seat 60 to be disconnected from the base support 50 intuitively and safely. This disconnection can be performed when the seat 60 is in the temporarily locked connection, which is very stable and could be used even when the vehicle is a driving condition (although this is never recommended). In order to disconnect the seat 60, all that needs to be done is to preferably lightly lift the rear of the seat 60 and/or seat interface 20 in an overall rearward sliding movement (i.e. either by the backrest, arm supports, and/or any other part of the seat 60 or seat interface 20 that can be gripped), so as to dislodge it from the temporarily locked connection. Then, the vehicle seat 60 and/or seat interface 20 can be pulled or slid in a rearward direction. This simple manipulation returns the seat 60 to its initial installation position, i.e., before it is slid along the guide members 32. This disconnection is useful for inspection or for servicing and maintenance purposes. It is thus readily apparent from the above described method how the seat connector 10 according to the present invention facilitates the rapid connection and disconnection of a vehicle seat 60 to a base support 50.

Finally, and according to the present invention, the seat connector and its components are preferably made of substantially rigid but lightweight materials, such as metallic materials (steel, aluminum, zinc, and/or others, as well as combinations thereof), hardened polymers, composite materials, and/or the like, whereas other components thereof according to the present invention, in order to achieve the resulting advantages briefly discussed herein (ex. lightweight, low cost, etc.), can be made of a polymeric material (plastic, rubber, etc.), and/or the like, depending on the particular applications for which the seat connector is intended for and the different parameters in cause (weight, wear factors, etc.), as apparent to a person skilled in the art.

Furthermore, the present invention is a substantial improvement over the prior art in that, by virtue of its design and components, the seat connector facilitates vehicle seat connection and disconnection when compared to what is generally known in the art and is relatively simple and easy to manufacture and/or assemble, without compromising the reliability of its functions. Hence, it may now be appreciated that the present invention represents important advantages over other vehicle seat fasteners and/or connectors known in the art.

Indeed, the connector according to the present invention allows quick, tamper-proof, wobbling-free and low-effort connection and disconnection between a vehicle seat and its base support. Contrary to other devices known in the art, the connector allows an ergonomic sliding motion to connect the seat and base, while the retainers cooperate so as to prevent multi-directional movement and rotation, which may lead to hazardous seat falls or other risks, and this, even if securing fasteners are not installed. The securing fasteners add a further level of multi-directional restraint in cases of vehicle turnover or accidents.

Yet another advantage of the present invention is that it reduces the effort required by the technician to bring a heavy seat over the base support without, in certain cases, being able to see how these parts must be aligned. This solution is arrived at through the method according to the present invention, and by the guide members and corresponding slide members which cooperate to align the two parts without more than a push from the technician, all the while supporting at least a portion of the weight of the seat. Thus, it is understood that the guide members provide many advantages, such as: facilitating the sliding engagement of the slide members, and preventing the seat interface from moving rearward when in the locked position because of the rearward angle of the glide members.

In the method according to the present invention, the seat interface and/or vehicle seat's initial position allow the installation crew to lift and lay down the seat in an advantageous backward tilted manner onto the base interface and base support. This is desired because it keeps the weight of the seat close to the body, thus reducing the strain on the technician, especially when repeated installations and removals are performed. This further advantageously allows the crew to be able to see the parts that must be aligned together when manipulating the load. This reduces back, arms and shoulder efforts. During removal, the same reduced effort can be employed to remove the seat from the same initial position. This reduced effort is ideal for technician crews, and facilitates the reduction of workplace injuries. It can thus now be appreciated that the method herein described is useful in that it permits a simplification of various maintenance operations performed on the seat throughout its useful life.

Furthermore, the present invention provides a solution to a problem currently seen in many installation systems, which is the locked position for seats known in the art being hazardous when not secured. In contrast, the locked position according to the present invention of the vehicle seat over the base support ("locked" meaning in this sense before the fasteners secure the connection) maintains the two parts connected while being serviced or otherwise. The fasteners can, and often must, be added for further securing the connection for non-normal conditions of use. The security of the locked position prevents a dangerous fall of the seat or base in maintenance operation or if human error occurs when connecting the seat when securing fasteners are not present, for example. By adding the fasteners to secure the connection, the connection is further advantageously strengthened and can prevent the separation of the seat from its base by technician tampering during service, or in case of a severe turn over or vehicle accident.

Still another advantage of the present invention results from the noses on the slide members, which serve as contact points for the seat interface and the attached vehicle seat when placed on the floor before installation and during maintenance. The noses thus advantageously serve a dual purpose, helping the sliding and retention of the seat interface on the base interface and supporting the seat when placed on the ground.

Of course, the scope of the claims should not be limited by the preferred embodiments set forth in the examples, but should be given the broadest interpretation consistent with the description as a whole. Numerous modifications could be made to the above-described embodiments without departing from the scope of the claims, as apparent to a person skilled in the art. Furthermore, it is apparent that this invention can apply to many other uses.

The invention claimed is:

1. A seat connector for removably connecting a vehicle seat with a base support, the seat connector comprising:
   a base interface removably mountable to the base support, the base interface being provided with at least one guide member;
   a seat interface removably connectable to the base interface and being configured for receiving the vehicle seat, thereby removably connecting the vehicle seat with the base support, the seat interface being provided with at least one cooperating member such that the at least one cooperating member cooperates with the at least one guide member upon removably connecting the seat interface to the base interface, thereby creating a temporarily locked connection between the vehicle seat and the base support;
   at least one support provided on the base interface, the at least one support supporting at least a portion of a weight of the seat interface at least prior to or during cooperation of the at least one cooperating member with the at least one guide member; and
   at least one movement restrictor being provided on at least one of the base interface and the seat interface, the at least one movement restrictor restricting movement of the vehicle seat relative to the base support upon temporarily locking of the vehicle seat with the base support,
   wherein the at least one guide member comprises a rear extremity corresponding to a rear of the base interface and a front extremity corresponding to a front of the base interface, the at least one guide member sloping toward the base support along its length from the rear extremity to the front extremity such that the at least one guide member slidably guides the at least one cooperating member upon removably connecting the seat interface to the base interface.

2. A seat connector according to claim 1, wherein the at least one cooperating member comprises a slide member configured for contouring the corresponding said at least one guide member so that the slide member is slidably guided by the at least one guide member.

3. A seat connector according to claim 2, wherein the slide member comprises at least one rounded nose for supporting the seat interface when laid upon the ground.

4. A seat connector according to claim 3, wherein the rounded nose of the slide member cooperates with the at least one guide member so as to facilitate cooperation between the slide member and the at least one guide member.

5. A seat connector according to claim 1, wherein the at least one support is provided substantially near the rear of the base interface.

6. A seat connector according to claim 1, the seat connector comprising pairs of the at least one guide member, the at least one cooperating member, the at least one support, and the at least one movement restrictor, each pair being provided in opposed symmetric relation on the base interface or the seat interface.

7. A seat connector according to claim 6, wherein each support in the pair of supports is provided in opposed symmetric relation to the other substantially near the rear of the base interface.

8. A seat connector according to claim 1, wherein the at least one movement restrictor comprises two retainers in opposed symmetric relation substantially near the front of the base interface.

9. A seat connector according to claim 8, each retainer comprising a protrusion extending upward at an angle to the base interface.

10. A seat connector according to claim 1, wherein the at least one movement restrictor comprises two stop members in opposed symmetric relation substantially near the rear of the base interface.

11. A seat connector according to claim 10, each stop member comprising a bump projecting from the seat interface.

12. A seat connector according to claim 1, wherein the at least one guide member supports the at least portion of the weight of the seat interface at least prior to or during cooperation of the at least one cooperating member with the at least one guide member.

13. A seat connector according to claim 1, wherein the base interface and the seat interface comprise notches, the notches of the seat interface aligning with the notches of the base interface upon removably connecting the seat interface to the base interface.

14. A seat connector according to claim 13, wherein the aligned notches are secured by mechanical fasteners selected from the group consisting of industry-standard fasteners, tamper-proof mechanical fasteners, and an automatic snap-in device.

15. A seat connector for removably connecting a vehicle seat with a base support, the seat connector comprising:
   a base interface removably mountable to the base support, the base interface being provided with at least one guide member; and
   a seat interface removably connectable to the base interface and being configured for receiving the vehicle seat,
   wherein the seat interface removably connects to the base interface by sliding along at least a portion of the base interface until the seat interface is in a temporarily locked connection for being eventually secured to the base interface, thus connecting the vehicle seat with the base support,
   and wherein the at least one guide member comprises a rear extremity corresponding to a rear of the base interface and a front extremity corresponding to a front of the base interface, the at least one guide member sloping toward the base support along its length from the rear extremity to the front extremity such that the at least one guide member slidably guides the seat interface upon removably connecting the seat interface to the base interface.

16. A seat connector according to claim 15, wherein at least one guide member is shaped to receive a front of the seat interface when placed at an angle against a rear of the at least one guide member.

17. A seat connector according to claim 15, wherein the seat interface comprises a seat interface rear extremity positioned, shaped, and sized to permit lifting of at least one of the seat interface and the attached vehicle seat in an overall rearward sliding movement until the seat interface is disconnected from the temporarily locked connection to the base interface.

* * * * *